(12) United States Patent
Chapman et al.

(10) Patent No.: US 7,028,052 B2
(45) Date of Patent: Apr. 11, 2006

(54) SYSTEMS AND METHODS FOR NOTIFYING A CONSUMER OF CHANGES MADE TO A CREDIT REPORT

(75) Inventors: Thomas F. Chapman, Atlanta, GA (US); Jeffrey L. Dodge, Alpharetta, GA (US); Joy T. Millard, Acworth, GA (US); Markus R. Satterfield, Alpharetta, GA (US); Alexander C. Smythe, Marietta, GA (US); Patrick S. Trigonoplos, Alpharetta, GA (US)

(73) Assignee: Equifax, Inc., Atlanta, GA (US)

( * ) Notice: Subject to any disclaimer, the term of this patent is extended or adjusted under 35 U.S.C. 154(b) by 446 days.

(21) Appl. No.: 09/852,597

(22) Filed: May 10, 2001

(65) Prior Publication Data

US 2002/0169747 A1    Nov. 14, 2002

(51) Int. Cl.
G06F 17/30 (2006.01)
G06F 17/00 (2006.01)
G06F 17/60 (2006.01)
G06G 7/00 (2006.01)

(52) U.S. Cl. .................. 707/104.1; 707/102; 705/30; 705/38; 705/44; 705/400

(58) Field of Classification Search .............. 707/1, 707/102, 104.1, 200; 705/30, 35, 38, 44, 705/400, 412; 709/224
See application file for complete search history.

(56) References Cited

U.S. PATENT DOCUMENTS

| | | | |
|---|---|---|---|
| 6,029,149 A | 2/2000 | Dykstra et al. | 705/38 |
| 6,055,570 A * | 4/2000 | Nielsen | 709/224 |
| 6,088,686 A | 7/2000 | Walker et al. | 705/38 |
| 6,112,190 A | 8/2000 | Fletcher et al. | 705/38 |
| 6,119,103 A | 9/2000 | Basch et al. | 705/35 |
| 6,311,169 B1 | 10/2001 | Duhon | 705/38 |
| 6,405,181 B1 | 6/2002 | Lent et al. | 705/38 |
| 2001/0011245 A1* | 8/2001 | Duhon | |
| 2002/0087460 A1* | 7/2002 | Hornung | |
| 2002/0116322 A1* | 8/2002 | Schnall | 705/38 |
| 2002/0133462 A1* | 9/2002 | Shteyn | |
| 2002/0194143 A1* | 12/2002 | Baberjee et al. | |

FOREIGN PATENT DOCUMENTS

| | | |
|---|---|---|
| EP | 1 028 401 | 8/2000 |
| WO | WO 99/49424 | 9/1999 |
| WO | WO 00/02150 | 1/2000 |

OTHER PUBLICATIONS

Dennis, Sylvia, "Soups Up ID Theft MOnitoring Service", Newsbytes,Jan. 26, 2001,p. 1.*
About ID Guard, web.archive.org/web/20011024051700/privista.com, Jan. 4, 2001.*

(Continued)

Primary Examiner—Luke S. Wassum
Assistant Examiner—Kuen S. Lu
(74) Attorney, Agent, or Firm—Kilpatrick Stockton LLP

(57) ABSTRACT

A system and method for monitoring unauthorized changes to a database and providing a notification to a user according to preferences set by the user. The user can select one or more data entries within a database to be monitored. When these data entries are changed, a notification is sent to the user.

86 Claims, 14 Drawing Sheets

OTHER PUBLICATIONS

New Privista Product Provides Early Warning System to Combat Identity Theft ID Guard To Build Consumer Confidence, Save Companies in Lost Revenue (Oct. 23, 2000) file://C:\WINNT\Profiles\lwang\Temporary%20Internet%20Files\OLK4E\privista%20-%20 (2 pages).

CreditCheck Monitoring Service—Why wonder what your credit report says? With the CreditCheck® Monitoring Service, you'll know! (Dec. 11, 2000) file://C:\WINNT\Profiles\lwang\Temporary%20Internet%20Files\OLK4E\Credit%20check% (2 pages).

PrivacyGuard.com Set your records straight (Dec. 11, 2000) file://C:\WINNT\Profiles\lwang\Temporary%20Internet%20Files\OLK4E\PrivacyGuard.htm (2 pages).

Experian Consumer Center (Dec. 11, 2000) file://C:\WINNT\Profiles\lwang\Temporary%20Internet%20Files\OLK4E\Experian%20Con (1 page).

Index-Learn—No Waiting No Wondering No Doubts (Dec. 11, 2000) http://www.creditability.com/secondary/learn/iLearn.asp (3 pages).

International Search Report in related PCT/US02/14654.

* cited by examiner

SYSTEMS AND METHODS FOR NOTIFYING A CONSUMER OF CHANGES MADE TO A CREDIT REPORT

FIELD OF THE INVENTION

The invention relates to systems and methods for monitoring changes to selected fields of a database. Particularly, the invention relates to systems and methods that monitor changes made to a database such as a credit report related database and notify a user or consumer when predetermined changes are made to the database.

BACKGROUND OF THE INVENTION

The advent of technology advancement has made life easier for many people. Technology makes life easier for merchants by allowing them to transact a sale even when customers do not have sufficient cash for the purchase. The merchants offer credit card purchase backed by credit card issuing institutions who then own the receivable. The technology also makes it possible for consumers to make a purchase without ever visiting a store. Consumers can place their order from a web site or by telephone and pay with their credit cards. This new model in retailing relies heavily on technology and more importantly on the availability of credit information.

Having good credit is becoming an important factor in a person's life. A good credit rating is becoming a precious commodity in today's society. A person with good credit can apply for credit cards and make purchases without carrying cash. A person with good credit can obtain a mortgage loan easily and pay favorable interest rates. Society makes life easier and more affordable for people who have good credit.

In contrast, a person with less than perfect credit may be required to pay higher interest rates for a credit card. A person with bad credit may not be able to obtain a mortgage loan to purchase a house, and even if he is able to obtain a loan, it is likely that he will be required to pay a higher interest rate and to put down more money for the down payment. Bad credit may even prevent a person from obtaining the necessary loan to purchase an automobile for transportation purposes.

Although important to a person's life, a person's credit is affected by many factors. Credit is often impacted by one's action. Late mortgage payments and failure to repay student loans will damage one's credit. Credit may also be impacted by actions from third parties. Failure to record a car loan payment by a financial institution may lead the financial institution to report that the consumer is late in his payments. A retailer's mistake in reporting a failure for payment from someone with the same name may affect one's credit. Often a person does not learn about the damage to his credit until financial institutions turn down his application for credit, in which case he has to go through a painful process to clear mistakes and errors in order to restore his credit.

With such a strong impact on people's lives, more and more people are closely guarding their credit. More people want to know as soon as possible when their credit information changes for whatever reason, so they can take early action and not be caught by surprise.

However, recording and reporting errors and mistakes are not the only reason for changes in a person's credit rating. A new crime known as identity theft has caused problems for many people by damaging their credit rating. This new crime is the product of technology advancement. Technology now enables thieves to steal a person's identification information and usurps the person's identity without the person knowing it until the person's credit is damaged.

Thieves can steal information about a person through a variety of sources, such as a credit card receipt or an on-line database housed by merchants. Once a thief obtains some personal information on a person, the thief can impersonate this person in a variety of transactions. A thief can request a credit card based on the credit of that person and place purchase orders with no intention of ever paying for them. A thief may also change the address of a person in order to get more financial information about that person and do more damage to the credit rating of that person. In addition, all of this is done without the person ever knowing it or having a chance to stop it.

Often consumers only learn that someone has stolen their identities after the damage to their credit rating is done. The suspicions usually arise when a credit request is declined, or a loan application turned down, or worse when a collection letter is received.

To clear up their names and restore their credits, consumers need to report the crime to police, alert credit rating agencies, and essentially prove that they are not responsible for the delinquencies. This task can be frustrating and time consuming.

SUMMARY OF THE INVENTION

The present invention provides systems and methods for monitoring changes and modifications to a predetermined number of data elements in a database. Whenever predetermined data element is changed or modified, the system provides a notification to a user whose watch list includes such elements.

A preferred embodiment of the present invention comprises a server functionally accessible from a network. The server functionally includes a database that stores data elements collected from several sources and a computer program that interfaces with users, monitors changes to the data elements, and sends notifications to the users. The database is generally a credit report database or repository, which contains data collected from or reported by different financial institutions, banks, and other credit bureaus. The database has a plurality of entries, and each entry may contain information about a particular consumer. Each entry may contain a consumer's identification information and other credit related data elements. Examples of the data elements are current address, bankruptcy indicator, collections indicator, foreclosure indicator, etc. The notifications can be sent in any number of ways, such as an e-mail to a user defined e-mail destination, a pager to the user's paging device, or a call to the user's telephone or wireless communication device.

The consumer can subscribe to the monitoring service in different ways, among them are through web site access or by contacting the service provider directly. During the subscribing procedure, the consumer provides his personal information such as social security number, driver's license number, etc. The service provider may employ a multi-stage authentication to further identify the subscriber. The service provider may ask the consumer to provide personal information generally not available to third parties. The service provider may ask the name of the mortgage company that holds the consumer's mortgage or the amount of monthly mortgage payments. When the consumer answers these questions correctly, he is properly identified. If the consumer fails to provide the correct answers, the service provider may still provide the monitoring service after the consumer supplies copies of a list of documents to the service provider for identification purposes.

After the consumer is identified, she is given an identification code and a user code. The consumer may then use this identification code and the user code to access the system to set up her monitoring criteria. She may be asked to select data elements she wants to monitor and the manner in which to be notified. The consumer can select the data elements from all the data elements that made-up her credit file, and place these data elements into a watch list. She can specify if she wants to be notified by e-mail, or by a telephone call among other possibilities. When an e-mail notification occurs, the user can visit the web site; alternatively, the information may be provided in the e-mail or telephone call itself.

The system receives information from a variety of sources and updates the database in a continuous manner. When a data element in the watch list is modified, the system generates a notification and sends it to the consumer who placed the data element in the watch list. When the consumer receives the notification, he logs into the system, presents his user and identification codes, and checks for the changes made to his credit file. If the change is unexpected or in error, then the consumer can be given the opportunity to request an investigation or place an alert to the system.

The investigation and the alert to the system can catch reporting mistakes or identity-stealing problems in an early stage, thus providing a chance for the consumer to take an active role to solve the problem while it has not caused extensive damage.

Pricing/billing can be implemented in any number of ways. It can be predicated on a per transaction basis, whether per email or call, minutes in a session on the website to learn the details of the change. It can be predicated on a flat or adjustable periodic charge based on value and/or number of fields being watched or monitored; more may be charged, for instance, to watch for certain field changes than others, or for changes to more fields than fewer.

BRIEF DESCRIPTION OF THE DRAWINGS

The foregoing and other aspects and advantages of the invention described herein will be better understood from the following detailed description of one or more preferred embodiments of the invention with reference to the drawings in which.

DETAILED DESCRIPTION OF THE INVENTION

Figure 1:
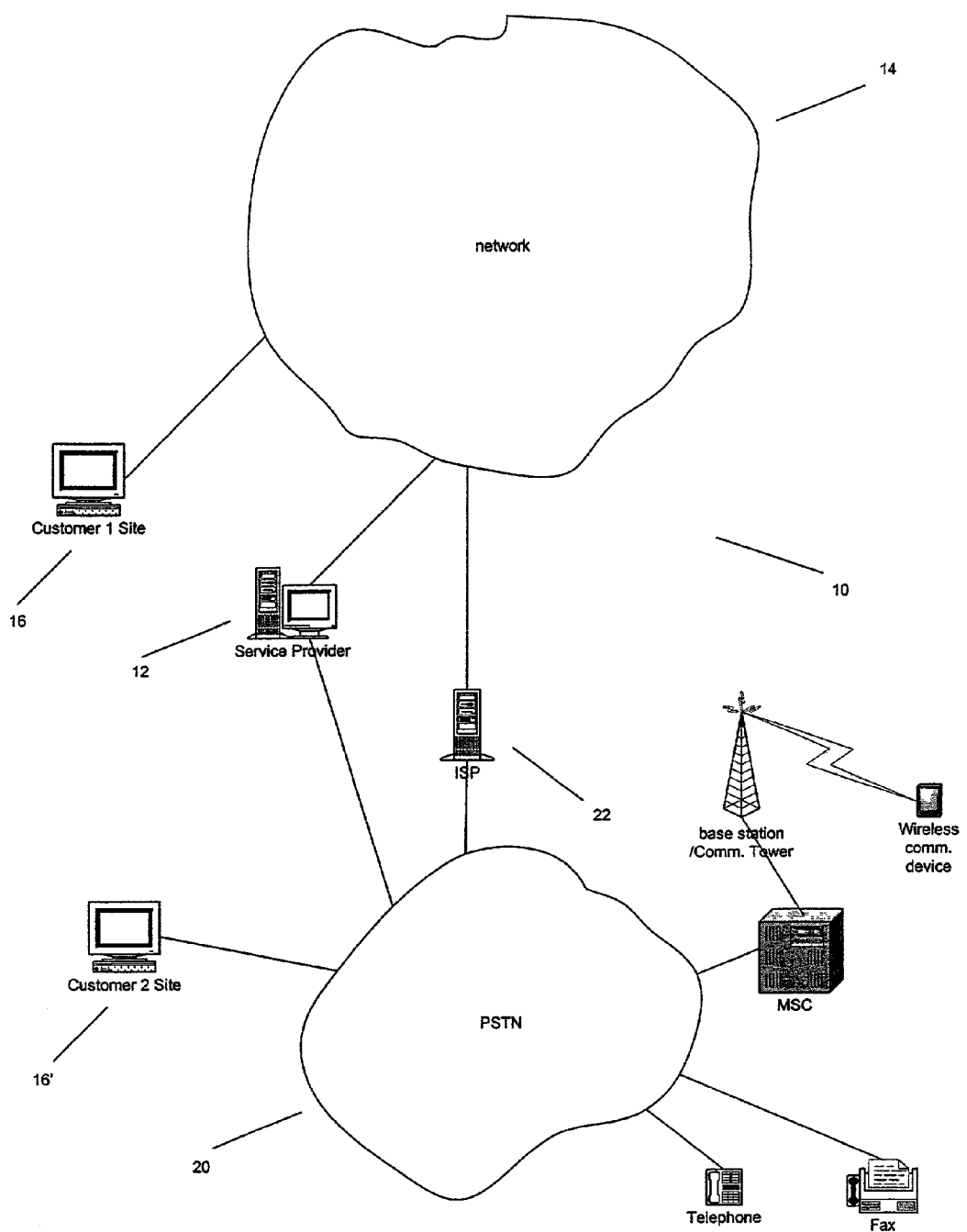
FIG. 1 depicts a system architecture according to one embodiment of the present invention.

The terms user, customer, and subscriber are used interchangeably in this application. Referring now in greater details to the drawings, in which like numerals represent like components throughout several views, FIG. 1 depicts an architecture of a system 10 according to the present invention. The system 10 has a server 12 accessible through a network 14. The network 14 may be or include as a segment any one or more of, for instance, the Internet, an intranet, a LAN (Local Area Network), WAN (Wide Area Network) or MAN (Metropolitan Area Network), a frame relay connection, Advanced Intelligent Network (AIN) connection, a synchronous optical network (SONET) connection, a digital T1, T3, or E1 line, Digital Data Service (DDS) connection, DSL (Digital Subscriber Line) connection, an Ethernet connection, ISDN (Integrated Services Digital Network) line, a dial-up port such as a V.90, V.34 or V.34bis analog modem connection, a cable modem, an ATM (Asynchronous Transfer Mode) connection, FDDI (Fiber Distributed Data Networks) or CDDI (Cooper Distributed Data Interface) connections, WAP (Wireless Application Protocol), GPRS (General Packet Radio Service), GSM (Global System for Mobile Communication) or CDMA (Code Division Multiple Access) radio frequency links, RS-232 serial connections, IEEE-1394 (Firewire) connections, USB (Universal Serial Bus) connections or other wired or wireless, digital or analog interfaces or connections.

The server 12 provides a data change monitoring service to consumers 16 (customers). There are different ways for the customer 16 to reach the server 12 for service. Among the possibilities, a customer 16 may be connected directly to the network 14, the customer 16' may need to dial-up into an Internet Service Provider (ISP) 22 to access the network 14 and the server 12, the customer 16" may dial into a telephone network (PSTN) 20 to access the server 12 for service.

A server 12 has a database (shown in FIG. 2), which is a deposit of credit information collected from a variety of reporting sources. This credit information can be reported, for example, by a financial institution regarding delinquent loans, by a credit card company regarding late payments, or by a bank on address change for a particular customer. The server 10 may rate consumers that are listed in their database based on the credit information collected and provide this rating to other institutions who inquire the credit worthiness of a consumer. The server 12 is generally accessible via a network or through a dial-up access.

A customer 16 may access the server 12 in different ways. He can use a computer to access the server 12 through the network 14 and make a selection of data to watch by accessing a web site supported by the server 12. Alternatively, the customer 16" can also make a selection by making a telephone call to the server 12 and entering his selection through the keypad of the telephone. In yet another embodiment, the customer 16'" can make a selection by accessing the server 12 through a wireless communication device.

The customer 16 receives a notification when a change has been made to his credit file, and he can receive this notification in a plurality of ways. He can receive an e-mail communication at his computer, receive a telephone call at his home or office, receive a fax, or receive a call on his wireless communication device.

Figure 2:
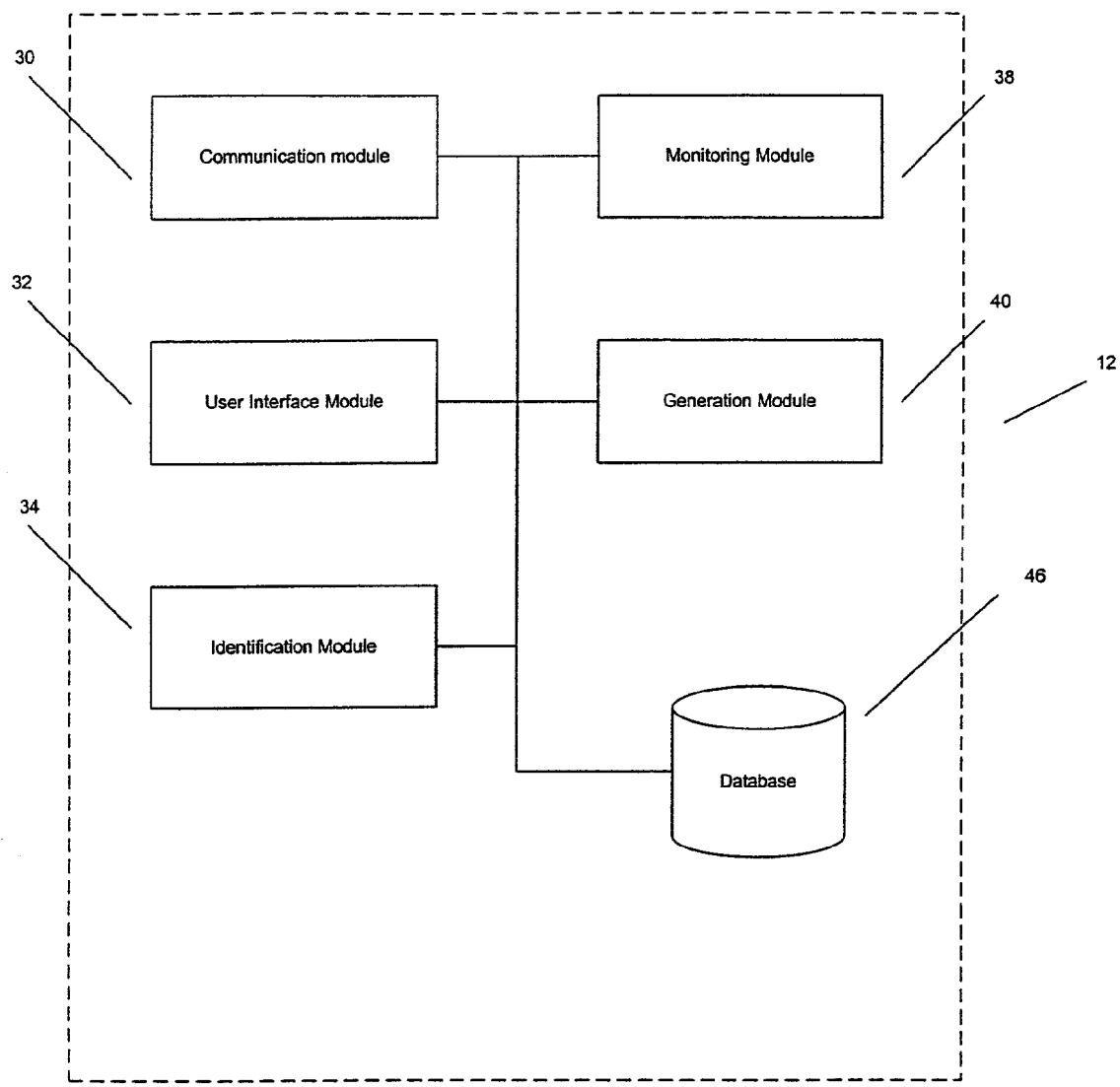
FIG. 2 depicts a software architecture according to one embodiment of the present invention.

FIG. 2 is a block diagram of software modules inside the server 12. In one embodiment, the server 12 has a communication module 30, a user interface module 32, an identification module 34, a monitoring module 38, a generation module 40, and a database 46.

The user interface module 32 is responsible for interfacing with customers. The user interface module 32 is responsible for prompting customers for their identification information. The user interface module 32 is also responsible for handling the new customer sign-up process. In a preferred embodiment, a user must become a subscriber to access the monitoring service. During the signing-up procedure, the user interface module 32 asks personal information, such as the user's name, address, social security number, and driver license information from the user and assigns a customer code and an identification code to the user. In an alternate embodiment, the user interface module 32 may employ a multi-stage identification scheme, wherein the user interface module 32, besides prompting for the customary user information, asks for additional credit related personal information that would not normally be available to third parties. The credit related personal information may include, among other possibilities, the name of the mortgage company that provides a loan to the user, the amount of monthly mortgage payment, etc. The user's subscription is accepted only after the user is properly identified. After signing up for the monitoring service, the customer can set a criterion for data change monitoring.

The customer can set criteria for data monitoring. He can identify which changes to his credit file are to be monitored, how and when he is to be notified of any changes. For example, the customer may only desire monitoring of multiple credit report requests within a predetermined time. The customer may identify the monitoring and notifying criteria as three credit report requests within a thirty (30) day period. Therefore, if the server 12 detects that three credit report requests have been made within a thirty day period, the server 12 sends a notification to the customer.

The customer may also elect to monitor any reporting of late payments or missed payments from any financial institutions. The customer will then receive a notification whenever a bank reports a late payment for a loan or a department store reports a nonpayment on a credit card.

The customer may also elect to monitor changes to certain data elements in the database 46. The database 46 contains credit related information for each consumer. The database 46 has generally one entry per consumer. Each entry identifies a consumer by the consumer's name, social security number, or other unique information. Each entry has a plurality of data fields, and each data field stores a data element. Examples of the data fields are current address field, former address field, bankruptcy indicator field, etc.

The customer can input the monitoring criteria from a data input mechanism provided by the user interface module 32. The data input mechanism can be among other possibilities a data input screen displayed on a computer screen or on a personal digital assistant (PDA) screen, an audio response system through a telephone device, or other input means. The customer is also prompted for a selection of a method of communication that will be used to dispatch notifications when a data change is detected. The customer can choose among other possibilities to receive notifications via an e-mail, a telephone call to either customer's home, office, or wireless communication device, or a fax to customer's fax machine.

The user interface module 32 assigns a customer code and an identification code to the user after the user properly subscribed the monitoring service. In an alternate embodiment, the customer may be assigned one single identification code for accessing the server 12. The user supplies the customer code and the identification code when he accesses the server 12 to modify his data monitoring selection or to check data changes. The user interface module 32 displays a menu to the customers and receives selections from the customers.

The user interface module 32 is also responsible for displaying the changes to the customers. The customer 16 receives a notification about a data change detected on his credit file and is invited to access the server 12 to check the changes. When he logs into the server 12, he supplies his customer code and his identification code. In an alternate embodiment, the server 12 may employ a multi-stage authentication process. In this multi-stage authentication process, the server 12 asks first the user's customer code and identification code, and the server 12 asks for additional personal information to further authenticate the user. After the customer is authenticated, the server 12 will display a menu from where he can make a selection to view the data changes.

The communication module 30 is responsible for handling communication between the server 12 and the customer 16. In a preferred embodiment, all communication between the server 12 and the customer 16 are transmitted in a secured manner. The communication module 30 encrypts all out-going messages and decrypts incoming messages. The communication module 30 may communicate with the customer 16 by sending an e-mail, placing a telephone call, sending a facsimile, or sending a paging message.

The monitoring module 38 is responsible for monitoring the data stored in the database 46. The monitoring is a continuous process, and the database 46 continuously receives data compiled from outside sources. The database 46 has a plurality of entries, each entry has information on a particular person. Each entry has a number of data fields. When an information, for example the current address, pertaining to a particular person has changed, a flag is set for this data entry indicating the change. The monitoring module 38 detects the flag and dispatches the identification module 34.

The identification module 34 is responsible for identifying the change and the customer 16. The identification module 34 checks the data entry to identify the customer 16 and the data field that has changed. The customer profile is retrieved for analysis. If the customer 16 has selected to monitor the data field that has changed, then the customer 16 will be notified about this change and the flag is reset. If the customer 16 did not select to monitor this data field, then the flag is reset and the customer will not receive a notification.

The generation module 40 is responsible for generating a notification to the customer 16. The notification indicates to the customer 16 that a change has been detected on his credit file. The notification may include information directing the consumer to, for example, a member center or a web site to obtain additional information. The notification may also include a telephone number, an e-mail address, a post office address, etc. that the customer 16 may use to obtain further information. The notification may further include a hyper text link to the service provider's web site, and the customer 16 can click on this link to access the web site to obtain additional information. In an alternate embodiment, the generation module 40 may generate a notification that includes information on the data change. The notification may list the data field that has changed and the new data itself. In a preferred embodiment, a notification with sensitive information, such as credit data, is transmitted through secure transmission media. In yet another alternate embodiment, the notification may include instructions on how a customer 16 may request an investigation, if the change seems to be unexpected or in error.

Figure 3:
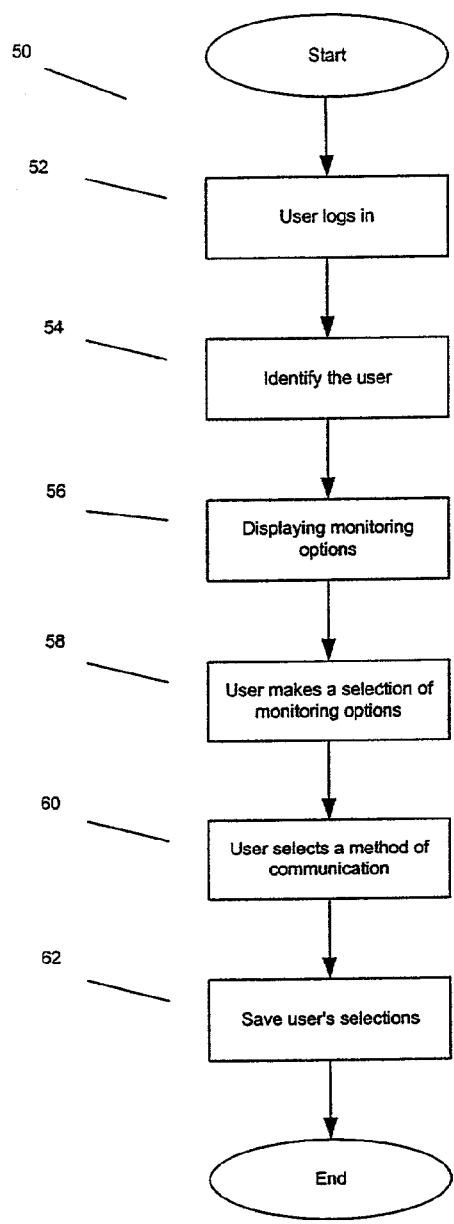
FIG. 3 is a flow chart for a user set-up process according to one embodiment of the present invention.

FIG. 3 illustrates a process 50 for a user to set-up a monitoring process. A user accesses the credit monitoring service by logging into the server 12, step 52. The user is usually located remotely from the server 12 and accesses the service by dialing into the server 12 via a telephone connection or via the Internet. The user can use a computer or a plain telephone to access the server 12. The user supplies a user code and an identification code, which can be a personal identification number (PIN) or a password. Alternatively, the user may be asked to supply additional personal information during a multi-stage authentication process. The server 12 identifies the user as a subscriber to the service, step 54, and grants the access to the system.

After granting the access to the user, the system displays a menu to the user, step 56. The menu displays a list of indicators that a user can choose to monitor individually or as a group. This list of indicators may include, for example, current address, former address, second former address, bankruptcy, collections, legal items, foreclosures, tax lien, garnishment, trade lines, and inquiries. These indicators represent data collected from a variety of sources and are normally included in a person's credit file. Other data from a person's credit file may also be included in this list of indicators.

The menu is preferably displayed on a computer screen or on a personal digital assistant screen at the user destination. In an alternate embodiment, the menu may be an audio menu played to the user's telephone.

The user selects from this menu the indicators he wants to monitor, step 58. The user can select one or more indicators to be monitored. The user can also set a condition under which he is to be notified when a change occurs to an indicator selected for monitoring. The user can choose to be notified, when a trade line has been open or closed, or when multiple credit reports have been requested within one month or another predetermined period of time.

The user also selects a preferred method of communication for receiving notifications, step 60. The user can specify how he wants to receive a notification. He can choose to receive via an e-mail sent to his e-mail address, a telephone call to his office or home, a fax to his fax machine, a paging message to his pager, his personal digital assistant (PDA) device, or a regular mail sent to his home or office. The notification may contain instructions to the customer on how to access the server 12 to obtain further information. In an alternate embodiment, the notification may contain information about the data change and instructions on how to contact the server 12 to initiate an investigation if the change is unexpected or in error.

The server 12 saves the user's selections and settings, step 62. The user can repeat the above procedure to change and modify his settings and selections.

Figure 4:
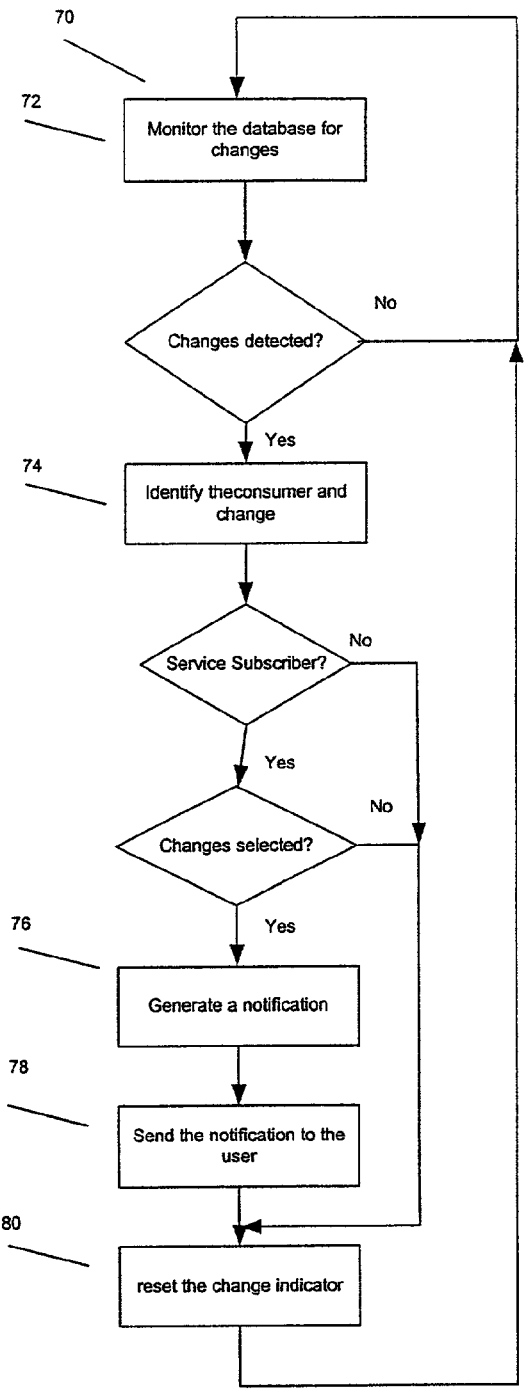
FIG. 4 is a flow chart for a system monitoring process according to one embodiment of the present invention.

FIG. 4 depicts a monitoring process 70 on the server 12. The monitoring process 70 is a continuous process that monitors the database changes, step 72. When an entry in the database changes, a flag is set to indicate the change. When a change is detected, the system checks the entry and identifies the user and the changes, step 74. The system also checks a subscriber database to see whether the user has subscribed to the monitoring service. If the entry belongs to a subscriber, the system checks the subscriber's profile if the subscriber (customer) has elected to monitor these changes. If the customer has elected to monitor these changes, then a notification is generated, step 76. The notification can be a simple message inviting the customer to access the system to get further information. In an alternate embodiment, the notification may also contain more detail information about the changes detected as well as instructions on how to access the system.

The system then dispatches the notification to the customer according to the method specified in the customer's preference, step 78. After sending the notification, the system resets the change indicator, step 80, and resumes the monitoring, step 72.

If after checking the data entry, the system detects the user is not a subscriber of the service or the customer has not elected to monitor these particular changes, the system simple resets the change indicator, step 80, and resumes the monitoring, step 72.

In one preferred embodiment, the monitoring step 72 is implemented as follows. A change monitoring process, also known as delta process, monitors the following eleven fields: current address CA, former address FA, second former address F2, bankruptcy BA, collection CO, legal items LI, foreclosure FO, tax liens TL, garnishment GN, trade lines PT, and inquiries IQ. When a change, or a delta, is detected, the delta is stored in three tables:

Sentinel_delta_files—table used to store delta report segments

Sentinel_delta_segments—table used to store the before and after segments for which the delta was detected.

Sentinel_delta_fields—table used to store information identifying which fields in the compared segments were different.

The changes for each field are detected as follows.

CA—Current Address:

The 'newness' criteria for the current address segment is that there is no CA in the previous FFF but there is one in the current FFF. Current address segment changes are identified by comparing the address reported date field.

FA—Former Address:

The 'newness' criteria for the former address segment is that there is no FA in the previous FFF but there is one in the current FFF. Former address segment changes are identified by comparing the address reported date field.

F2—Second Former Address:

The 'newness' criteria for the second former address segment is that there is no F2 in the previous FFF but there is one in the current FFF. Second former address segment changes are identified by comparing the address reported date field.

BP—Bankruptcy:

New bankruptcy segments are identified by comparing the following fields:
1. date filed
2. case number
3. court number
4. how filed
5. legal type If no matches are found in these fields while comparing a BP segment from the current FFF against all of the BP segments from the previous FFF, then the current BP segment is flagged and reported as new.

If matching BP segments are found, the following fields of the two segments (one from the current FFF and the other from the previous FFF) are compared. If found to vary, the current FFF BP segment will be flagged and reported as changed:
 1. bankruptcy disposition CO—Collections:
New collections segments are identified by comparing the following fields:
 1. date assigned
 2. account number
 3. member number
 4. client name If no matches are found in these fields while comparing a CO segment from the current FFF against all of the CO segments from the previous FFF, then the current CO segment is flagged and reported as new.

If matching CO segments are found, the following fields of the two segments (one from the current FFF and the other from the previous FFF) are compared. If found to vary, the current FFF CO segment will be flagged and reported as changed:
 1. collection status LI—Legal Items:
New legal items segments are identified by comparing the following fields:
 1. date filed
 2. case number
 3. court number
 4. plaintiff
 5. defendant If no matches are found in these fields while comparing a LI segment from the current FFF against all of the LI segments from the previous FFF, then the current LI segment is flagged and reported as new.

If matching LI segments are found, the following fields of the two segments (one from the current FFF and the other from the previous FFF) are compared. If found to vary, the current FFF LI segment will be flagged and reported as changed:
 1. legal item status
 2. satisfied date FO—Foreclosure:
The FO comparisons vary from those performed for the other public item segments in that only new foreclosures are checked for and reported. The fields used during the comparison process to determine whether an FO segment is new are:
 1. date reported
 2. member number TL—Tax Lien:
New tax lien segments are identified by comparing the following fields:
 1. date filed
 2. case number
 3. court number
 4. creditor class If no matches are found in these fields while comparing a TL segment from the current FFF against all of the TL segments from the previous FFF, then the current TL segment is flagged and reported as new.

If matching TL segments are found, the following fields of the two segments (one from the current FFF and the other from the previous FFF) are compared. If found to vary, the current FFF TL segment will be flagged and reported as changed:
 1. release date GN—Garnishment:
New garnishment segments are identified by comparing the following fields:
 1. date filed
 2. case number
 3. court number
 4. plaintiff
 5. garnishee
 6. defendant If no matches are found in these fields while comparing a GN segment from the current FFF against all of the GN segments from the previous FFF, then the current GN segment is flagged and reported as new.

If matching GN segments are found, the following fields of the two segments (one from the current FFF and the other from the previous FFF) are compared. If found to vary, the current FFF GN segment will be flagged and reported as changed:
 1. satisfied date PT—Trade Lines:
New trade lines segments are identified by comparing the following fields:
 1. date opened
 2. account type (revolving, installment, etc.)
 3. account designator (joint or individual)
 4. account number
 5. company name
 6. member number If no matches are found in these fields while comparing a PT segment from the current FFF against all of the PT segments from the previous FFF, then the current PT segment is flagged and reported as new.

If matching PT segments are found, the following fields of the two segments (one from the current FFF and the other from the previous FFF) are compared. If found to vary, the current FFF PT segment will be flagged and reported as changed:
 1. narrative code 1
 2. narrative code 2
 3. rate code
 4. previous rate 1
 5. previous rate 2
 6. previous rate 3

IQ—Inquiries:
New inquiry segments are identified by comparing the following fields:
 1. member number
 2. member name
 3. inquiry date IQ segment changes are not possible and so are not checked.

Figure 5:
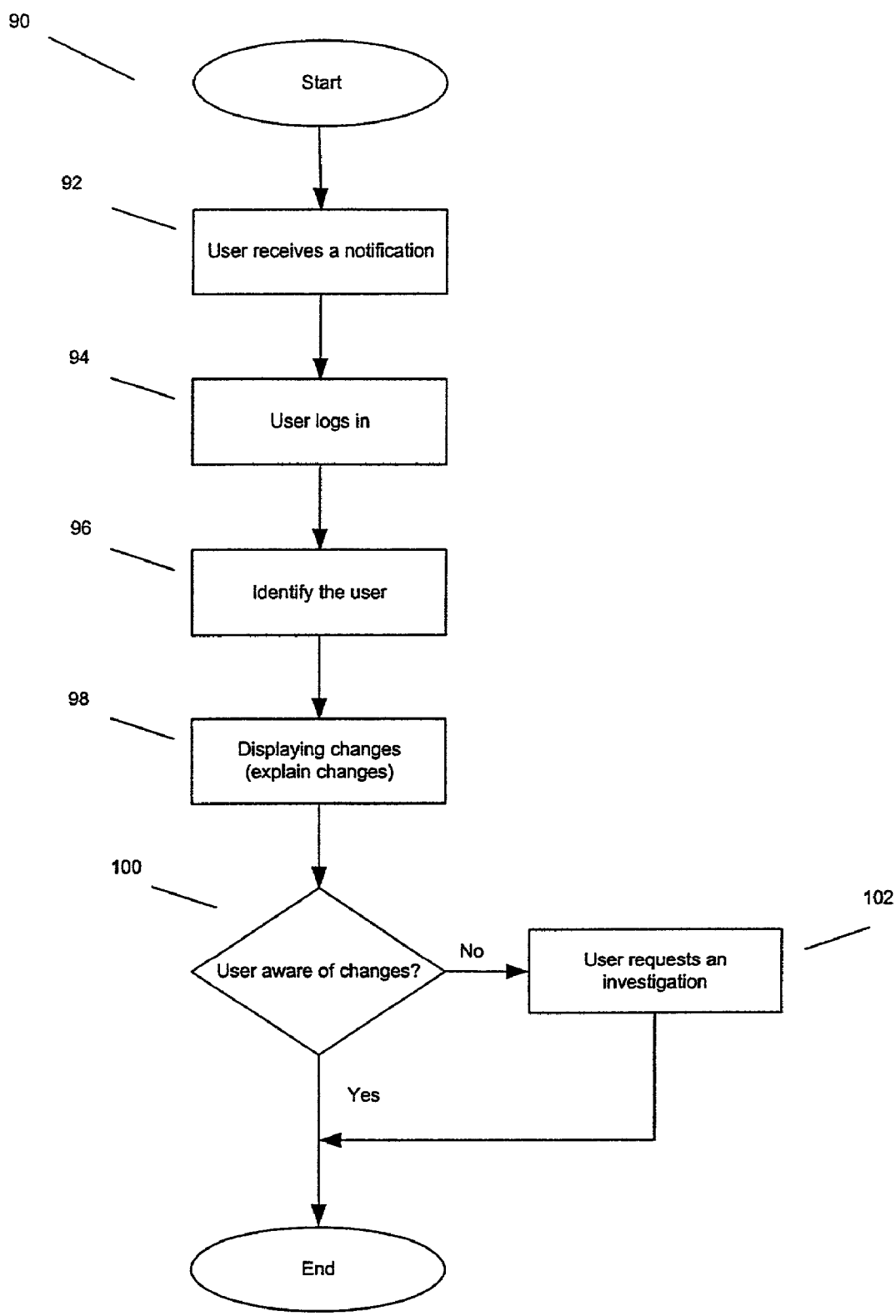
FIG. 5 is a flow chart for a user checking process according to one embodiment of the present invention.

FIG. 5 depicts a process 90 for a customer to check the changes. When a user receives a notification, step 92, he may be given specific instructions on how to access the system to verify the changes detected on his credit file, or he may just follow an established procedure to access his credit file. Generally, the user logs into the system, step 94, and provides his user code and identification code. The system checks the user code and the identification code and identifies the user as a subscriber, step 96. The system then displays a menu from which the user can choose to view changes to his credit file, step 98.

In an alternate embodiment, the server 12 may ask some personal information contained in the user's credit profile and use this information to authenticate the user.

In yet another alternate embodiment, the user may be given a special code in the notification, and the user can supply this code to the system upon logging in. The system will display directly the information about the changes.

If the changes are unexpected or in error, the user can request that an investigation be started, step 102.

The present invention is especially useful to consumers who want to protect their credit rating and to take an active role in policing changes to their credit files. A credit-reporting bureau or other entities that have access to a credit report repository may offer a credit watch service according to the present invention. Generally, a user needs to subscribe to a credit watch service with a service provider. After subscribing to the service, the user/subscriber can then specify what data he wants to monitor and how he wants to be notified.

The user can choose to monitor any adverse reporting to his credit file, i.e., any reporting of late payments or non-payments by any reporting institution, such as banks, retailers, etc. The user can also choose to be notified by an e-mail message sent to his PDA. The user's selections are stored in the user profile.

When a bank holding a loan to the user reports a late payment on the user's account to the credit-reporting bureau, either because the payment was received beyond the grace period or because of the bank's operational mistakes, the credit-reporting bureau will accept the reporting and update the user's credit file to reflect the late payment. The credit-reporting bureau will also flag that there is a change to the user's credit file.

The credit watch service is notified about the changes in the credit database, and the service will analyze the change. After analyzing the change and realizing that the change is to a monitored data in the user's profile, the credit watch service through its software sends out an e-mail message to the user's PDA.

When the user receives an e-mail notification at his PDA, the user learns about a change to his credit file and the user is also given directions on how to access the system to verify the change. The user may use his PDA to login into the system remotely. The user provides his subscriber code and identification code to gain the access to the system. After the system validates the user, the system displays the change to the user.

If the user disagrees with the reporting of the late payment by the bank because he is not late with a payment, the user is given the option to file a challenge to the reporting with the credit-reporting bureau. This challenge is then handled by the system. The system may require the bank to verify the reporting or to provide some written explanation to the user. If the challenge is successful, i.e., the bank cannot produce proof of any late payments, then the adverse reporting is removed from the user credit file. If the challenge is not successful, the adverse reporting stays in the user's credit file.

The present invention is also helpful to consumers who want to stop someone from stealing their identity at an early stage. Generally, when a thief steals a person's identity (i.e., assumes this person's credit identity), the thief tends to open new credit accounts with false addresses or overcharges the existing credit accounts. The opening of new credit accounts can be detected by monitoring credit-check requests. A creditor usually checks the credit of a credit account applicant before granting the credit. By monitoring credit-check requests, the user (customer) can be notified when there is a new credit-check request.

The user can be notified when a credit check is performed on his credit information. The user then accesses the system and obtains the information on the entity that requested the credit check. If the entity is unknown to him or the reason for the credit check is not readily apparent to him, he can contact this entity for farther inquiry as to the reason for such a credit check. If the credit check is done because someone applied for credit using his name, the user can then place a warning on his credit file, so other financial institutions can take precaution when dealing with people claiming to be this user. With help of the present invention, the user may be able to detect and to stop someone from stealing his credit identity.

The present invention can be marketed to consumers with different pricing options. The consumers must become a subscriber to receive notifications about changes to his credit profile. The subscription can be annually or monthly. The subscription price may be dependent on the number of data fields monitored, i.e., if a subscriber choose to monitor all data fields in his credit profile, he will pay more than another subscriber who chooses only to monitor fewer selected data fields. The means of notification that a subscriber chooses may also affect the subscription price. If the subscriber chooses to be notified by fax, he may have to pay more than if he chooses to be notified by e-mail. If the consumer chooses to receive notification in more than one place, he would pay more than what he would pay if he receives notifications in one place only.

There are different ways to implement the present invention and FIGS. 7–14 depict three embodiments and their respective internal processes.

Figure 6:
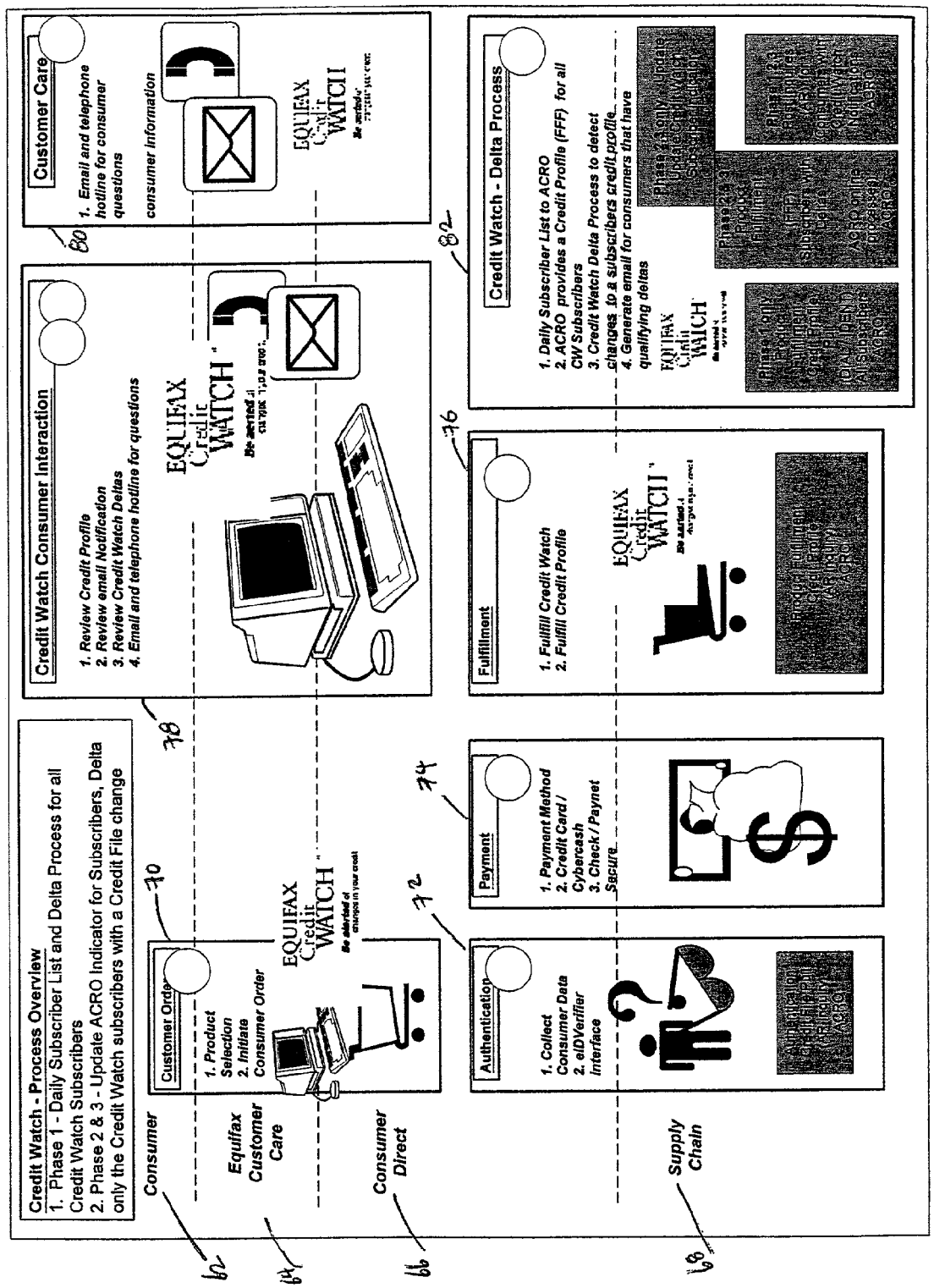
FIG. 6 is an overview of an embodiment of the monitoring process.

FIG. 6 is an overview of one embodiment of the monitoring process according to the present invention. The monitoring process involves several actors: consumer 62, customer care 64, consumer direct 66, and supply chain 68. Each actor may be a physical person, a team of experts, a software system, or an outside vendor. Customer care 64 is generally the customer support team. Consumer direct 66 is generally software elements of the system. Supply chain 68 may be internal or external support system, which can be external suppliers or internal identification systems. The credit modification monitoring service involves separate sub-tasks: customer ordering service 70, customer authentication service 72, payment service 74, fulfillment service 76, consumer interaction 78, customer care service 80, and delta process 82. Each of these sub-tasks may involve more than one actor.

Customer ordering service 70 allows a consumer to select what he wants to monitor and initiates an order for the monitoring service. Authentication service 72 collects the consumer data that identifies the consumer. Payment service 74 allows the consumer to select payment methods. Fulfillment process 76 finalizes consumer's service requests for monitoring services. Consumer interaction 78 is responsible for reviewing consumer's monitoring request, which includes reviewing consumer's credit profile, notification method, and monitoring delta. Consumer interaction 78 also provides e-mail and telephone support for monitoring services. Customer care 80 provides general customer support to the system. Delta Process 82 is responsible for detecting changes to a subscriber's credit profile.

Figure 7:
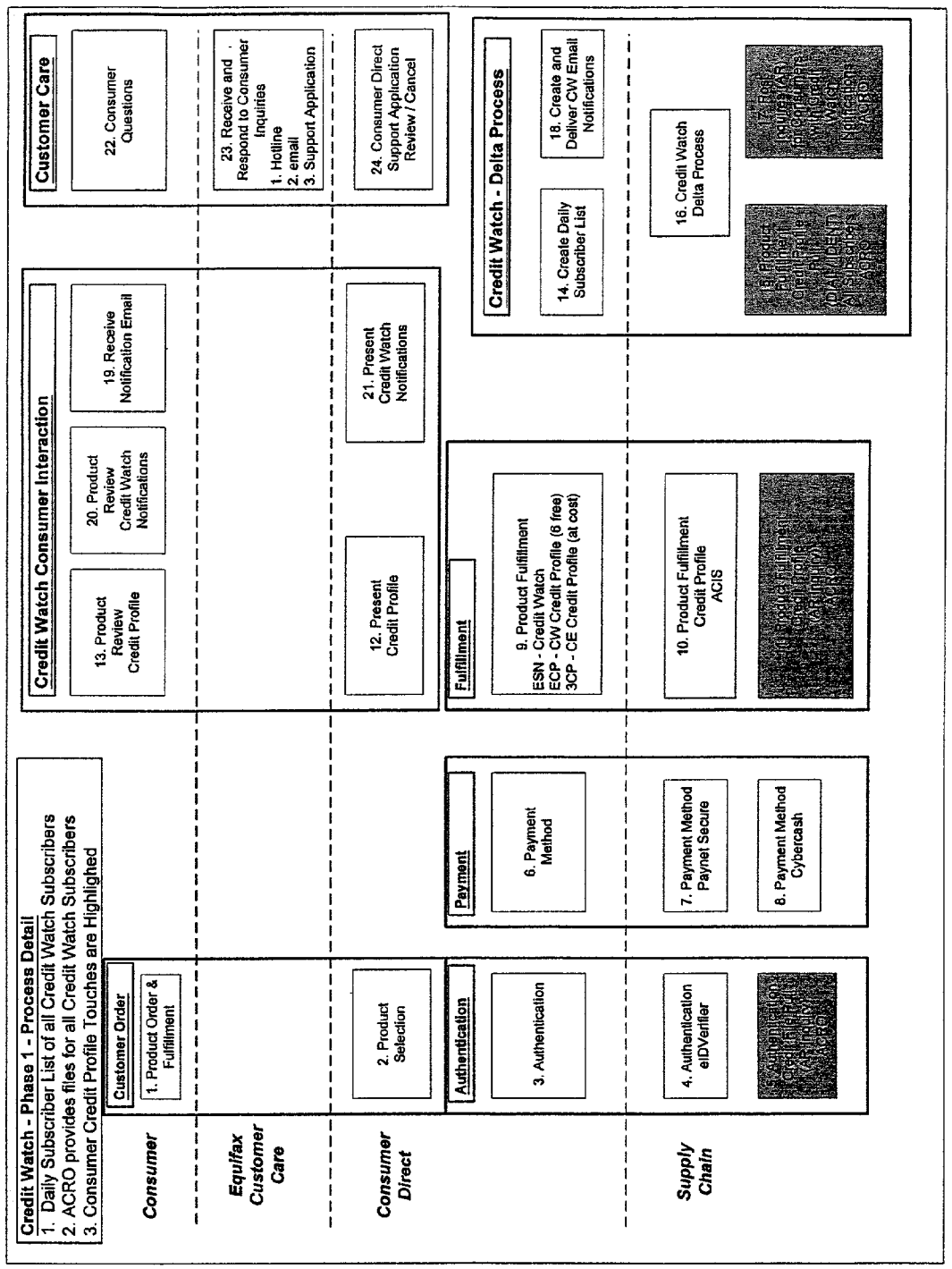
FIGS. 7–9 illustrate an alternate embodiment and interactions between processes and their details for this alternate embodiment.
Figure 8:
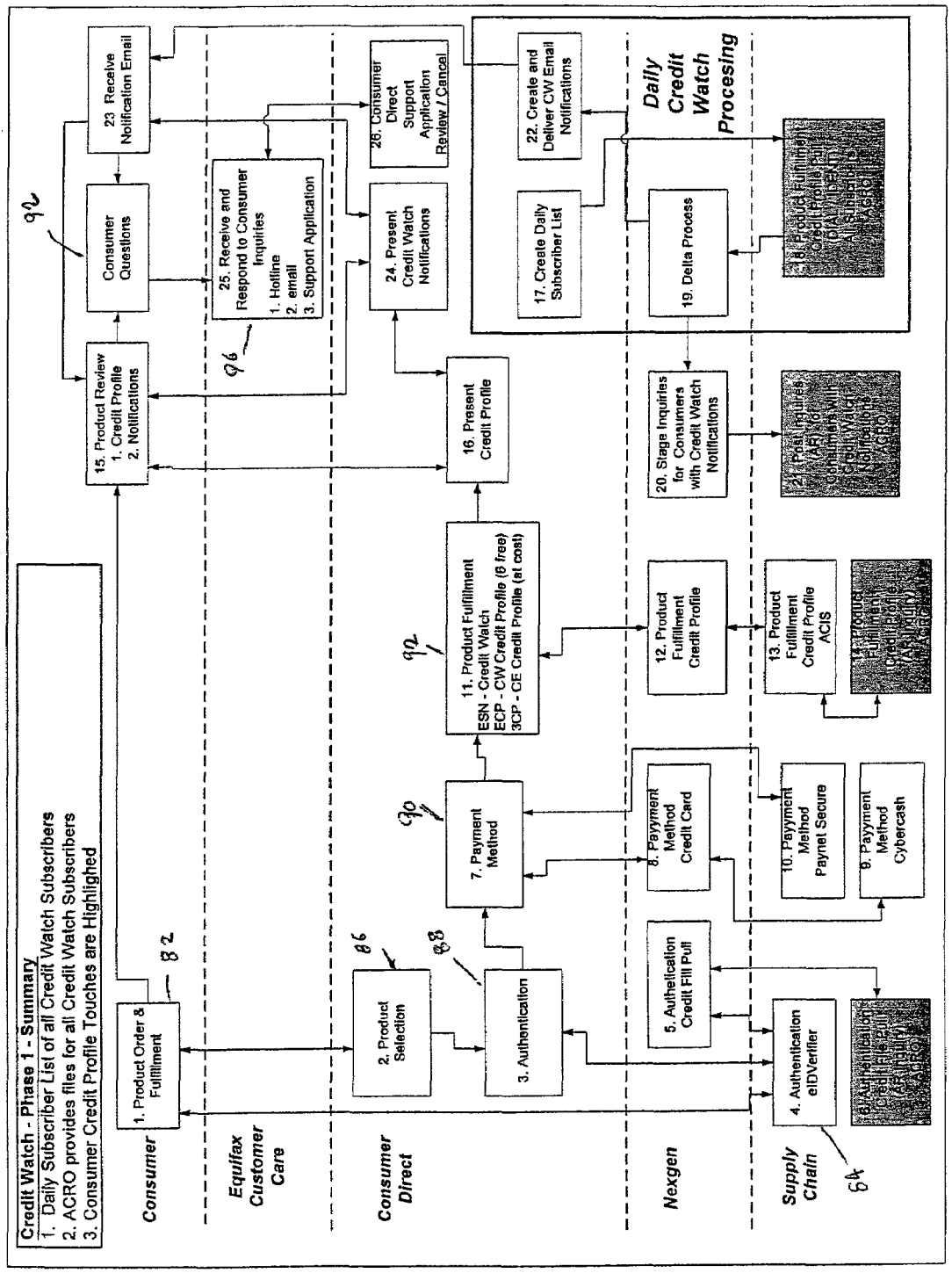
Figure 9:
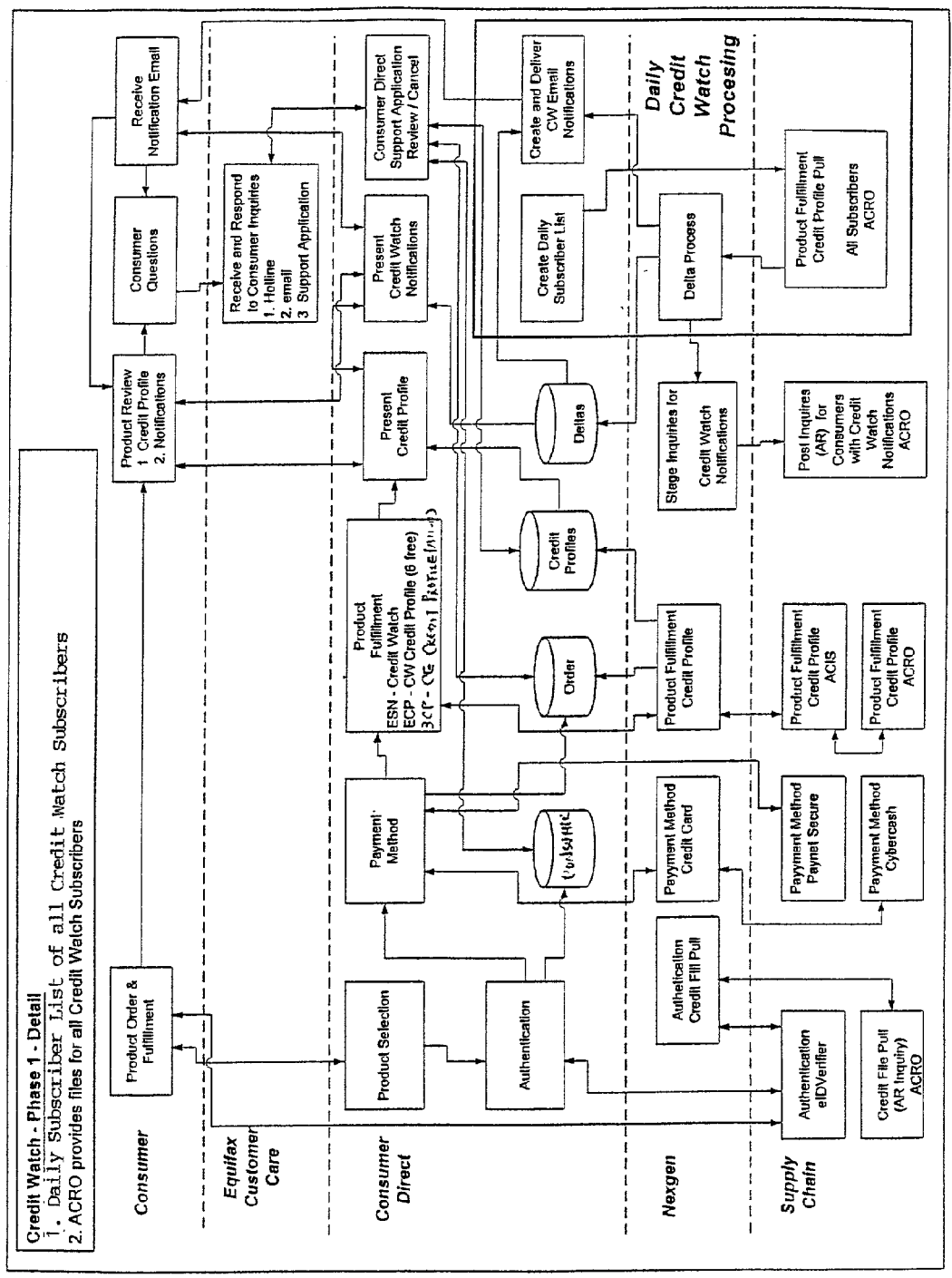

FIG. 7 depicts an alternate embodiment of the present invention, and FIG. 8 illustrates the interactions between different processes carried out by different actors in this alternate embodiment. FIG. 9 illustrates the interactions between the processes of FIG. 8 and different databases. Referring to FIG. 8, a consumer places an order through a product order and fulfillment process 82, and an authentication process 84 identifies the consumer before his order is processed. The consumer places his selection and payment information through a product selection process 86. The selection and payment information pass through an authentication process 88. A payment method process 90 handles the payment information with help from third party actors. A product fulfillment process 92 produces the credit information that the consumer has ordered. The credit information may be produced based upon information provided by third parties. The consumer can log into the system and review his credit profile. He can pose questions to a consumer questions process 94, which will provide answers with help from a process 96 supported by Customer Care. The consumer may receive answers to his questions through e-mails, telephone calls, or other suitable means. One skilled in the art can readily appreciate other features of this embodiment from FIGS. 7–9.

Figure 10:
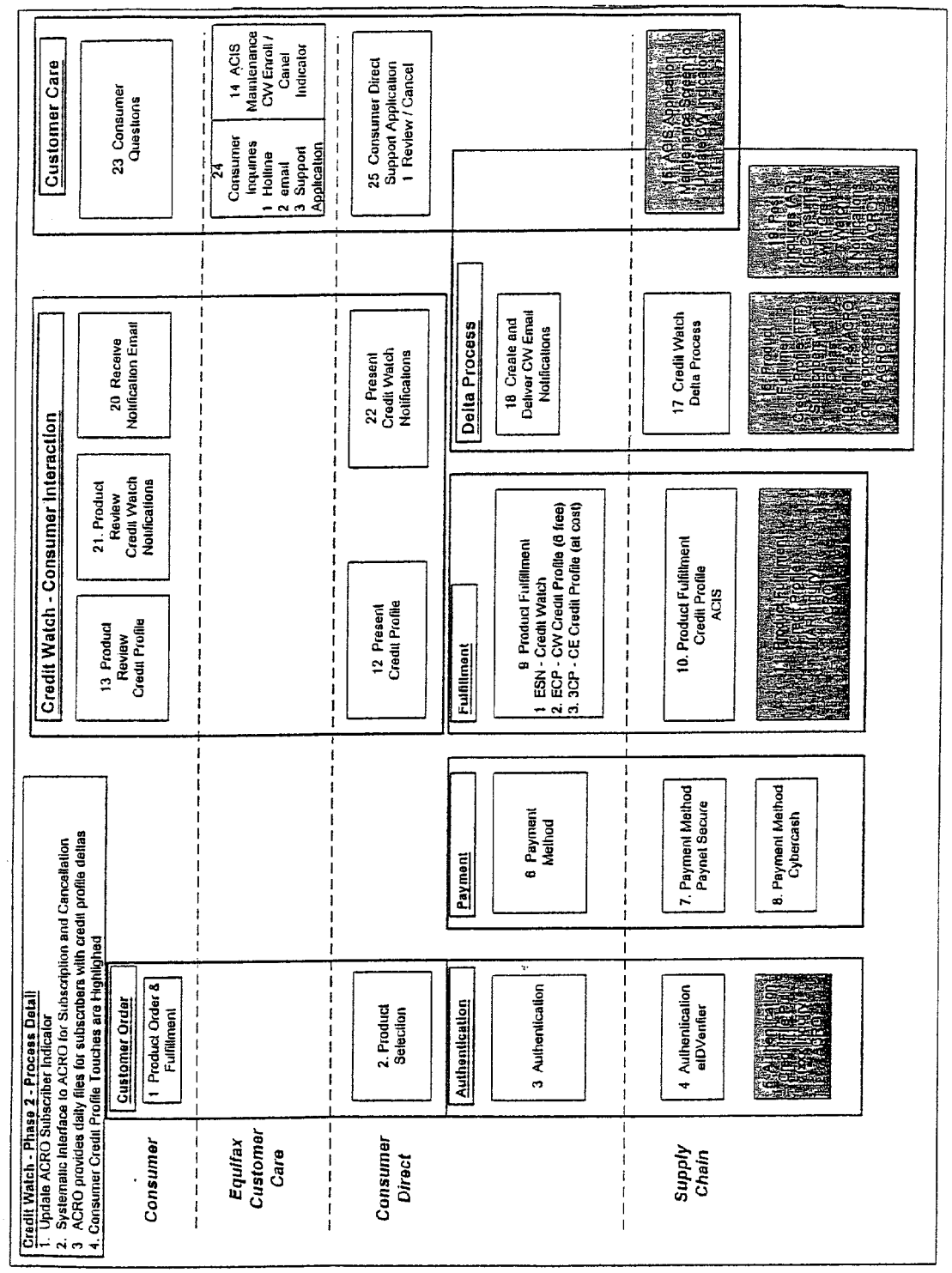
FIGS. 10–12 illustrate yet another embodiment and interactions between processes and their details for this embodiment.
Figure 11:
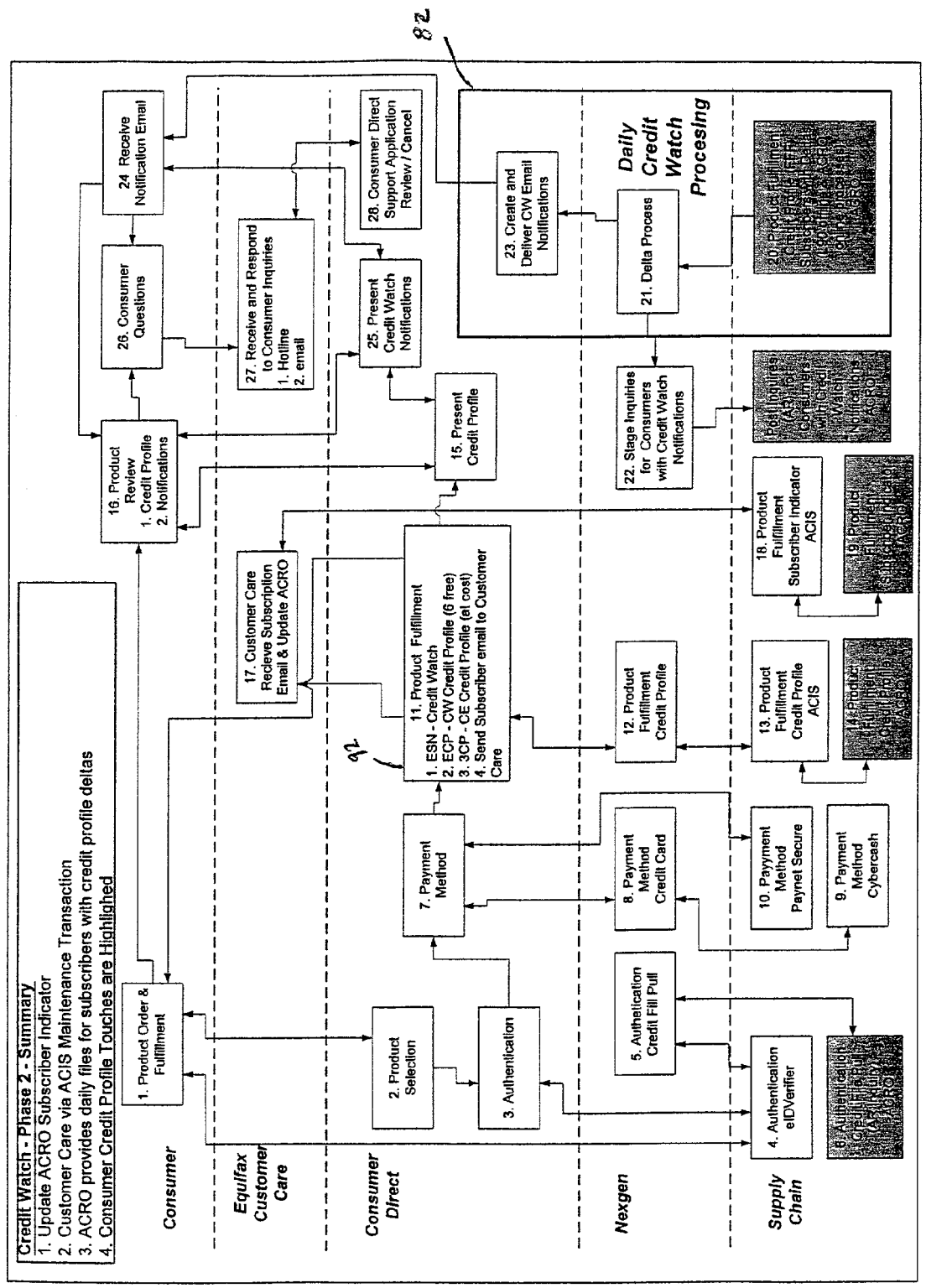
Figure 12:
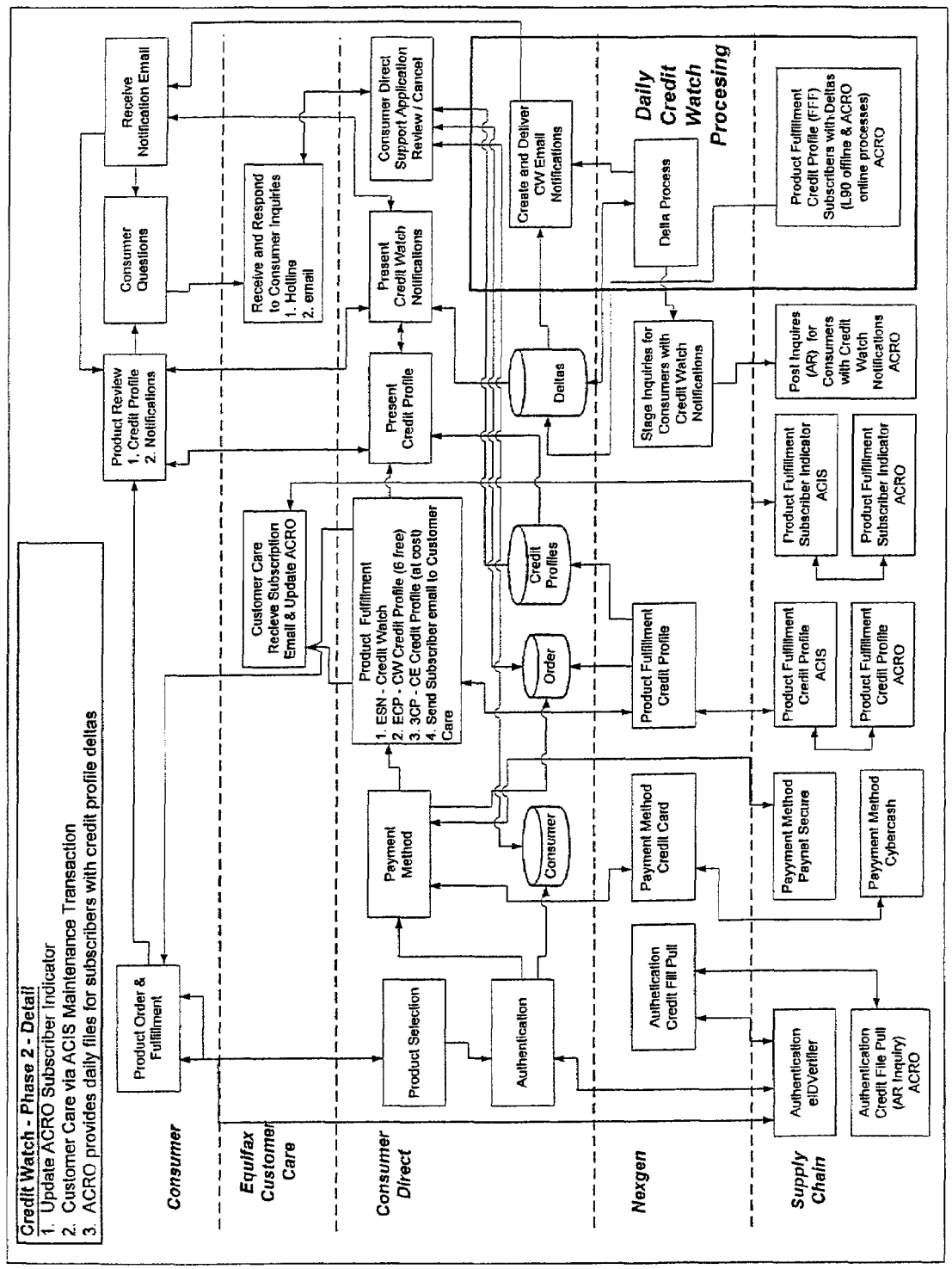

FIGS. 10–12 illustrate respectively yet another embodiment, the interactions between processes for that embodiment, and the interactions between the processes and one set of databases. In this embodiment, Customer Care receives e-mail notification about the product subscription from the Product Fulfillment process 92 and updates a credit reporting online system (ACRO). In this embodiment, the delta process 82 does not generate daily credit information for all subscribers. Instead, the delta process 82 only generates credit information for those subscribers whose credit information has changed. One skilled in the art can readily appreciate other features of this embodiment from FIGS. 10–12.

Figure 13:
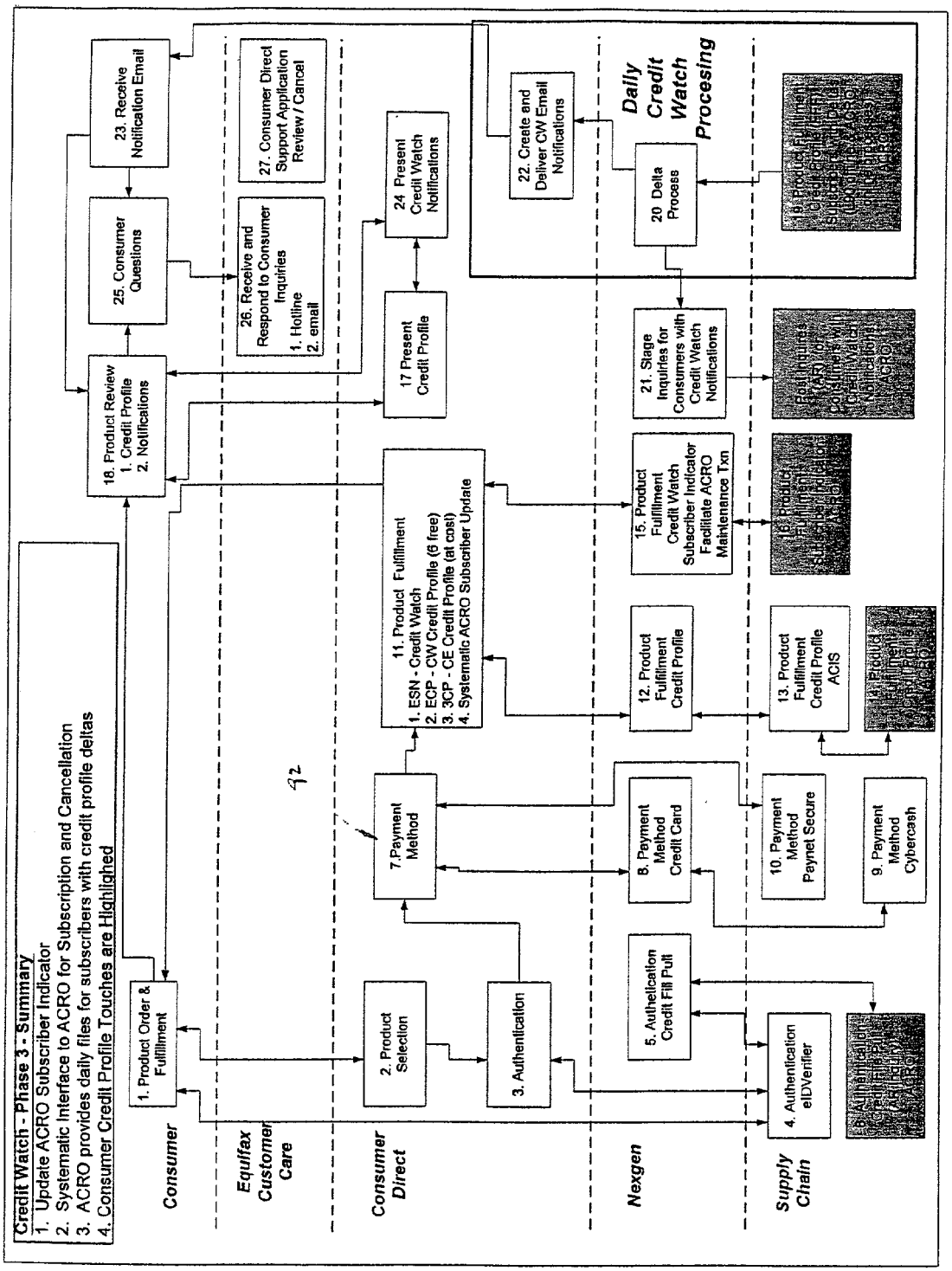
FIGS. 13–14 illustrate yet another embodiment and interactions between processes and their details for this embodiment.
Figure 14:
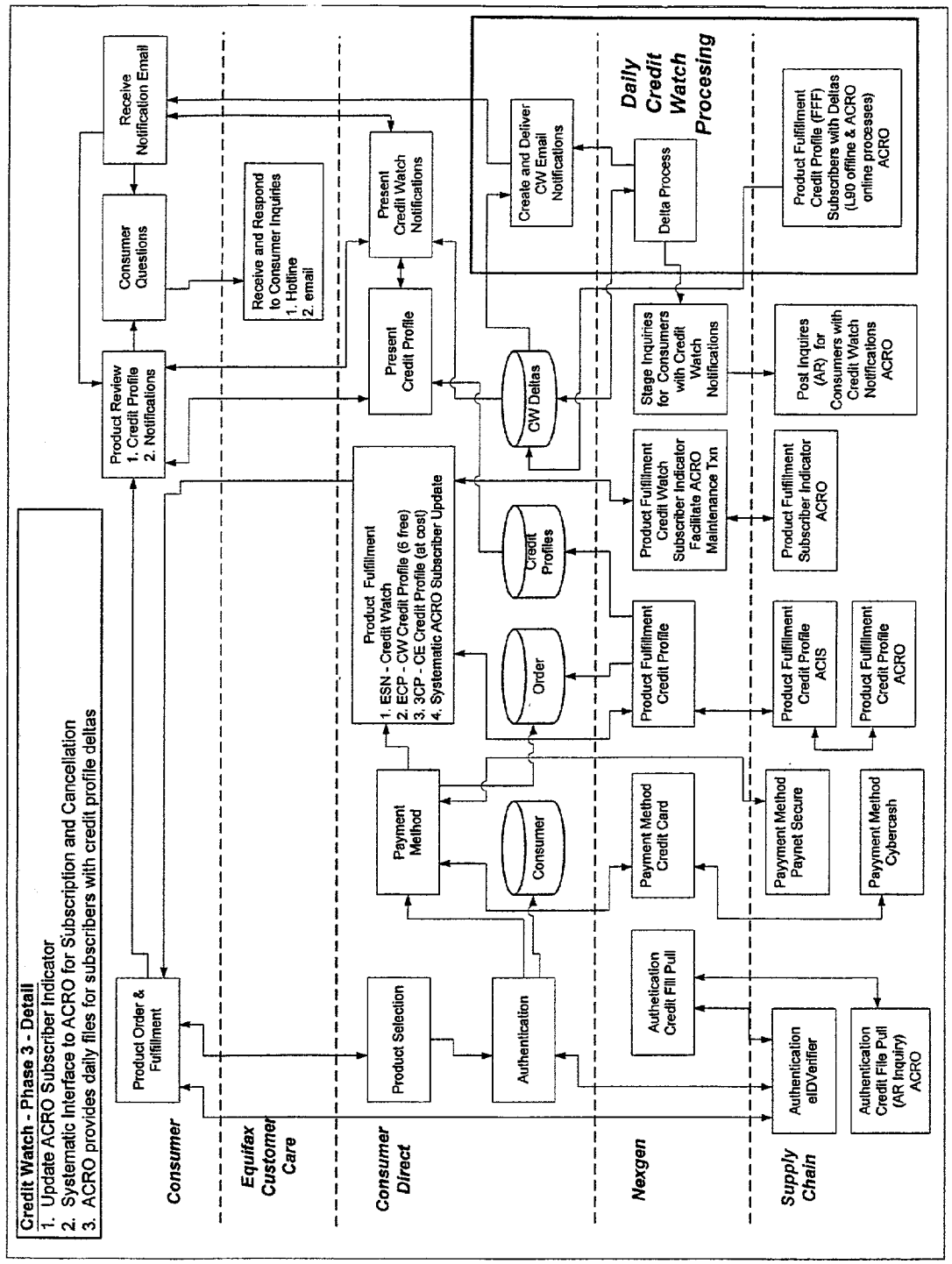

FIGS. 13–14 illustrate respectively the interactions between processes for an alternate embodiment and the interactions between the processes and one set of databases. In this embodiment, the Product Fulfillment process 92 is responsible for providing updates to the credit reporting online system (ACRO). One skilled in the art can readily appreciate other features of this embodiment from FIGS. 13–14.

A credit change monitoring service according to the present invention can be offered to consumers in different ways. A preferred way to make this service available to consumers is through subscription.

Figure 15:
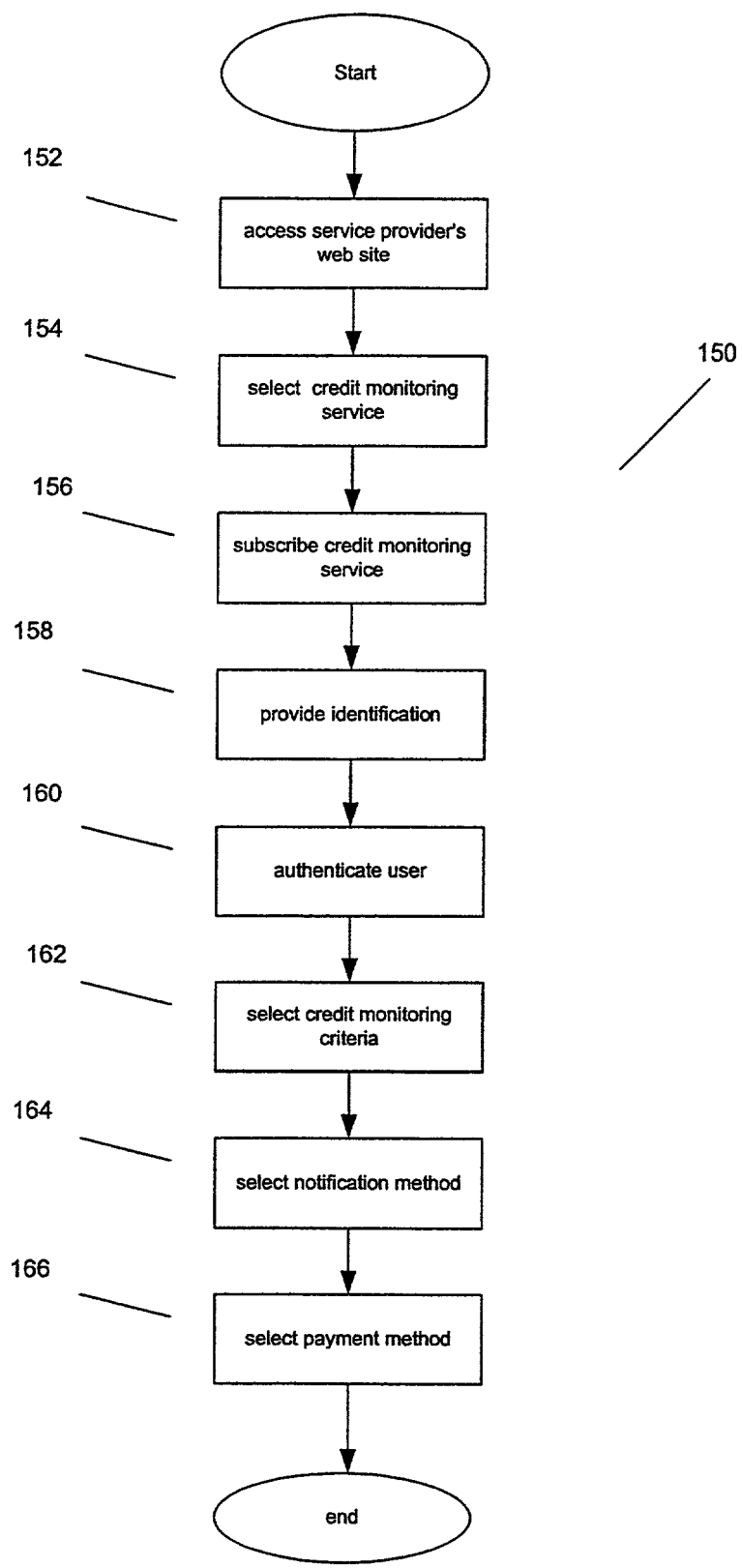
FIG. 15 depicts a subscription process.

FIG. 15 depicts a subscripting process 150 for a credit file monitoring service according to the present invention. A user can sign-up for the credit file monitoring service in multiple ways. He can sign-up through a written application, which he mails in after filling it out. Also, he can sign-up for the monitoring service by calling the service provider's customer service representatives. A preferred way to sign-up for the service is by accessing the service provider's web site, step 152.

The service provider may offer many different services on its web site, and the user has to select the credit file monitoring service, step 154. The user then proceeds to select the subscription of this monitoring service, step 156. The user must identify himself, step 158, by providing his personal information. The service provider may authenticate the user before accepting his subscription, step 160. The authentication may be through a multi-stage authentication process, where the service provider asks some questions regarding the user's credit history and the user has to answer them correctly. This multi-stage authentication process may be done through multiple choice questions. If the user fails to answer the questions correctly, he can still subscribe to the service by mailing in his personal identification information such as a copy of his social security card, a copy of a utility bill showing his address, etc.

After the service provider authenticates the user, the user can select credit data elements that he wants to monitor, step 162. He can choose one or multiple credit data elements for monitoring. The amount of data he chooses to monitor may affect his subscription price.

Also, the user needs to select a method of communication, step 164. The service provider uses this method to communicate with him when credit file data changes. He can select one or more methods of communication (i.e., he can choose to receive an e-mail or a paging message, or both e-mail and paging message), when a financial institution reports a change to his credit file. The user may also select frequency of communication. He can choose to be notified as soon as a change occurs in his credit file or be notified periodically. He may choose even to be notified when he is ready to receive any communication, i.e., the service provider will notify him when he makes an inquiry. The method and timing of communication and the number of destination may also affect the subscription price.

Finally, the user selects a method of payment, step 166. The service provider can bill him monthly, annually, or per use basis. The service provider may demand prepayment for its service, i.e., the service provider will accept monthly or annual payments before the service is provided for that period. The service may also bill the user on per use basis, i.e., each time there is a change, the user will be notified, and the user has to pay before being able to check the change.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A system for monitoring modifications on a plurality of elements in a credit reporting database, the modifications being at least partially definable by a user, the system comprising:

at least one server storing at least part of the credit reporting database, the credit reporting database having a plurality of entries, at least one of the entries having a plurality of elements, wherein each element can be modified by a datum collected from at least one financial entity; and at least one computer program residing in a computer-readable memory in the server, the computer program adapted to continuously monitor the elements of the credit reporting database for modifications to at least one element selected by the user;

wherein the system is capable of generating a credit report for the user and when at least one of said modifications occurs, sending a notification to the user substantially contemporaneously with when said at least one modification occurs, to the user that at least one modification has occurred.

2. The system of claim 1, wherein the at least one computer program is capable of sending the notification to more than one destination specified by the user.

3. The system of claim 1, wherein the plurality of elements correspond to at least
   a current address,
   a bankruptcy indicator, and
   a tax lien indicator.

4. The system of claim 1, wherein the at least one computer program comprises an e-mail server.

5. The system of claim 1, wherein the communication module is capable of receiving an instruction from the user to place a warning on an element in the credit reporting database.

6. A method for monitoring modifications on a plurality of credit related data elements in a credit reporting database, wherein the plurality of credit related data elements in the credit reporting database are collected from at least one financial entity, the modifications being at least partially definable by a user, the method comprising:
   obtaining a selection of at least one credit related data element from the user;
   continuously monitoring the at least one credit related data element selected by the user; and
   responsive to a change to the at least one credit related data element, notifying the user substantially contemporaneously with when the change occurs about the change to the at least one credit related data element.

7. The method of claim 6 further comprising:
   prompting the user for an identification code; and
   identifying the user.

8. The method of claim 6, wherein the notifying step further comprises:
   sending an e-mail notification to the user; and
   displaying the change to the user.

9. The method of claim 8 further comprising:
   providing the user with an investigation request procedure.

10. The method of claim 6, wherein the notifying step further comprises sending a paging signal to the user.

11. The method of claim 6, wherein the notifying step further comprises sending a credit change information through a secure transmission media.

12. The method of claim 6, wherein the at least one credit related data element is selected from a group consisting of a current address, a bankruptcy indicator, a collections indicator, a legal items indicator, a foreclose indicator, a tax lien indicator, a garnishment indicator, and an inquiry indicator.

13. The method of claim 6, further comprising:
   receiving a warning from the user regarding at least one credit related data element.

14. A method for monitoring changes on a plurality of credit related data elements in a credit reporting database, wherein the plurality of credit related data elements in the credit reporting database are collected from a plurality of financial institutions, the changes being at least partially definable by a user, the method comprising:
   allowing the user to make a selection of at least one credit related data element to watch;
   generating a credit file of the user, the credit file having the plurality of credit related data elements from the credit reporting database;
   continuously monitoring and comparing the plurality of credit related data elements in the credit file with the selection; and
   responsive to the selection having a credit related data element that is in the credit file, notifying the user substantially contemporaneous with when the credit related data element is detected in the credit file.

15. The method of claim 14, wherein notifying further comprises sending an e-mail to the user, wherein the e-mail has a link to a display web site.

16. The method of claim 14 further comprising modifying the selection.

17. The method of claim 14, wherein the notifying step further comprises sending a notification to a wireless communication device.

18. The method of claim 14, wherein the notifying step further comprises sending a notification to a personal digital assistant.

19. The method of claim 14 further comprising checking the credit file for modification flags.

20. The method of claim 14, wherein the at least one credit related data element is selected from a group consisting of a current address, a bankruptcy indicator, a collections indicator, a legal items indicator, a foreclose indicator, a tax lien indicator, a garnishment indicator, and an inquiry indicator.

21. The method of claim 14, further comprising:
   receiving a warning from the user regarding at least one credit related data element in the credit file.

22. A method of monitoring changes to at least one credit related data element of a credit reporting database, the method comprising:
   inputting a selection of the at least one credit related data element in a credit file of a user for continuous monitoring;
   providing a destination;
   generating a notification to the user substantially contemporaneously with when a change is detected;
   receiving the notification at the destination; and
   reviewing the change.

23. The method of claim 22, wherein the destination is a user-computing device.

24. The method of claim 22 further comprises requesting an investigation on the changes.

25. The method of claim 22, further comprising:
   providing a warning regarding the change to the credit reporting database.

26. A computer-readable medium on which is stored a computer program for monitoring data modifications in a credit reporting database, wherein the data in the credit reporting database are collected from a plurality of financial institutions, the computer program comprising instructions, which when executed by a computer perform the following:
   continuously monitoring at least a portion of data in the credit reporting database;
   detecting data changes in the credit reporting database that are in a credit file of a user;
   identifying a customer, the customer being the user;
   notifying the customer substantially contemporaneously with when the changes are detected about the changed data; and
   displaying the changed data to the customer.

27. The computer program of claim 26 further performing:
   receiving an identification code from the customer; and
   authenticating the customer.

28. The computer program of claim 26 further performing:
   displaying a group of credit related data to the customer, wherein the group of credit related data consists of a current address, a bankruptcy indicator, a collections indicator, a legal items indicator, a foreclose indicator, a tax lien indicator, a garnishment indicator, and an inquiry indicator; and receiving a data selection from the customer, wherein the customer selects a data from the group of credit related data.

29. The computer program of claim 26 further providing an investigation process to the customer.

30. The computer program of claim 26, further performing:
receiving a warning from the user regarding the changed data; and
storing the warning in the credit reporting database.

31. A method for providing credit modification monitoring service to a user, the method comprising:
subscribing to the credit modification monitoring service;
selecting a method of notification, wherein the method of notification comprises communication to the user substantially contemporaneous with when a change to at least one credit-related data element associated with the user is detected;
selecting at least one credit-related data element associated with the user for continuous monitoring; and
providing a method of payment.

32. The method of claim 31 further comprising;
setting a subscription price.

33. The method of claim 32, wherein the subscription price depends on the number of credit-related data elements selected for monitoring.

34. The method of claim 32, wherein the subscription price depends on the method of notification selected.

35. The method of claim 31, wherein selection of a method of notification further comprises
selecting a timing of notification.

36. The method of claim 35, wherein the timing of notification may be selected from a group consisting of immediate notification, periodic notification, and upon request notification.

37. The method of claim 36, wherein the subscription price depends on a frequency of the selected notification.

38. The method of claim 35 further comprising setting a subscription price, wherein the subscription price depends on the timing of notification.

39. The method of claim 31, wherein the method of payment is selected from a group consisting of monthly, annually, and per use basis.

40. The method of claim 31, wherein the method of payment is on a prepay basis.

41. A system for monitoring modifications to a credit reporting database, the modifications being at least partially definable by a user, the system comprising:
at least one server storing at least part of the credit reporting database, the credit reporting database having a plurality of entries, at least one of the entries having a plurality of elements, wherein each element can be modified by a datum collected from a plurality of credit reporting agencies; and
at least one computer program residing in a computer-readable memory in the server, the at least one computer program adapted to
continuously monitor the modifications to at least one element selected by the user,
report when at least a first modification to the at least one element occurs,
send a notification substantially contemporaneously with when the first modification to the at least one element occurs, to the user that a first modification has occurred,
report when at least a second modification to the at least one element occurs, and
send a notification substantially contemporaneously with when the second modification to the at least one element occurs, to the user that the second modification has occurred.

42. The system of claim 41, wherein the first modification comprises an erroneous modification to the at least one element and the second modification comprises a correction of the erroneous modification to the at least one element.

43. The system of claim 41, wherein the at least one computer program is capable of sending the notification to more than one destination specified by the user.

44. The system of claim 41, wherein the plurality of elements correspond to at least
a current address,
a bankruptcy indicator, and
a tax lien indicator.

45. The system of claim 41, wherein the at least one computer program comprises an e-mail server.

46. The system of claim 41, wherein the at least one computer program is further adapted to receive an instruction from the user to place a warning on an element in the credit reporting database.

47. A method for monitoring modifications on a plurality of credit related data elements in a credit reporting database, wherein the plurality of credit related data elements in the credit reporting database are collected from a plurality of financial institutions, the modifications being at least partially definable by a user, the method comprising:
obtaining a selection of at least one credit related data element from the user;
continuously monitoring the at least one credit related data element selected by the user;
notifying the user about a first modification to the at least one credit related data element substantially contemporaneously with when the first modification occurs; and
notifying the user about a second modification to the at least one credit related data element substantially contemporaneously with when the second modification occurs.

48. The method of claim 47, wherein the first modification comprises an erroneous modification to the at least one credit related data element and the second modification comprises a correction of the erroneous modification to the at least one credit related data element.

49. The method of claim 47 further comprising:
prompting the user for an identification code; and
identifying the user.

50. The method of claim 47, wherein either notifying step further comprises:
sending an e-mail notification to the user; and
displaying the change to the user.

51. The method of claim 50 further comprising:
providing the user with an investigation request procedure.

52. The method of claim 47, wherein either notifying step further comprises sending a paging signal to the user.

53. The method of claim 47, wherein either notifying step further comprises sending a credit change information through a secure transmission media.

54. The method of claim 47, wherein the at least one credit related data element is selected from a group consisting of a current address, a bankruptcy indicator, a collections indicator, a legal items indicator, a foreclose indicator, a tax lien indicator, a garnishment indicator, and an inquiry indicator.

55. The method of claim 47, further comprising:
receiving a warning from the user regarding at least one credit related data element.

56. A method for monitoring changes on a plurality of credit related data elements in a credit reporting database, wherein the plurality of credit related data elements in the credit reporting database are collected from at least one financial entity, the changes being at least partially definable by a user, the method comprising:
allowing the user to make a selection of at least one credit related data element to watch;
generating a credit file of the user, the credit file having the plurality of credit related data elements from the credit reporting database;
comparing the plurality of credit related data elements in the credit file with the selection to determine if the at least one credit related data element that was selected has been modified; and
responsive to the selection having a first modification of credit related data element that is in the credit file, notifying the user substantially contemporaneously with when the first modification of credit related data element is detected in the credit file;
responsive to the selection having a second modification of credit related data element that is detected in the credit file, notifying the user substantially contemporaneously with when the second modification of credit related data element is detected in the credit file.

57. The method of claim 56, wherein the first modification of credit related data element comprises an erroneous change to the credit related data element and the second modification of credit related data element comprises a correction of the erroneous change to the credit related data element.

58. The method of claim 56, wherein either notifying step further comprises sending an e-mail to the user, wherein the e-mail has a link to a display web site.

59. The method of claim 56 further comprising modifying the selection.

60. The method of claim 56, wherein either notifying step further comprises sending a notification to a wireless communication device.

61. The method of claim 56, wherein either notifying step further comprises sending a notification to a personal digital assistant.

62. The method of claim 56 further comprising checking the credit file for modification flags.

63. The method of claim 56, wherein the at least one credit related data element is selected from a group consisting of a current address, a bankruptcy indicator, a collections indicator, a legal items indicator, a foreclose indicator, a tax lien indicator, a garnishment indicator, and an inquiry indicator.

64. The method of claim 56, further comprising:
receiving a warning from the user regarding at least one credit related data element in the credit file.

65. A method of monitoring changes to at least one credit related data element in a credit file of a user of a credit reporting database, the method comprising:
inputting a selection of the at least one credit related data element for continuously monitoring;
providing a destination;
generating a first notification to the user substantially contemporaneously with when a first change to the at least one credit related data element is detected;
receiving the first notification at the destination;
generating a second notification substantially contemporaneously with when a second change to the at least one credit related data element is detected;
receiving the second notification at the destination; and
reviewing the changes.

66. The method of claim 65, wherein the first change comprises an erroneous modification to the at least one credit related data element and the second change comprises a correction of the erroneous modification to the at least one credit related data element.

67. The method of claim 65, wherein the destination is a user-computing device.

68. The method of claim 65 further comprises requesting an investigation on the changes.

69. The method of claim 65, further comprising:
providing a warning regarding the change to the credit reporting database.

70. A computer-readable medium on which is stored a computer program for monitoring data modifications in a credit reporting database, wherein the data in the credit reporting database are collected from a plurality of financial institutions, the computer program comprising instructions, which when executed by a computer perform the following:
detecting data changes in the credit reporting database that are in a credit file of a user, wherein the data changes comprise at least a first change and a second change;
identifying a customer, the customer being a the user;
notifying the customer substantially contemporaneously with when data changes are detected; and
displaying the data changes to the customer.

71. The computer-readable medium of claim 70, wherein the first change comprises an erroneous modification to the data and the second change comprises a correction of the erroneous modification to the data.

72. The computer-readable medium of claim 70 further performing:
receiving an identification code from the customer; and
authenticating the customer.

73. The computer-readable medium of claim 70 further performing:
displaying a group of credit related data to the customer, wherein the group of credit related data consists of a current address, a bankruptcy indicator, a collections indicator, a legal items indicator, a foreclose indicator, a tax lien indicator, a garnishment indicator, and an inquiry indicator; and
receiving a data selection from the customer, wherein the customer selects a data from the group of credit related data.

74. The computer-readable medium of claim 70 further providing an investigation process to the customer.

75. The computer-readable medium of claim 70, further performing:
receiving a warning from the user regarding the changed data; and
storing the warning in the credit reporting database.

76. A method for providing credit modification monitoring service to a user, the method comprising:
subscribing to the credit modification monitoring service;
selecting a method of notification, wherein the method of notification comprises communication to the user substantially contemporaneously with when a first change to at least one credit-related data element is detected, and further comprises communication to the user substantially contemporaneously with when a second change to the at least one credit-related data element is detected;

selecting at least one credit-related data element associated with the user for continuously monitoring; and providing a method of payment.

77. The computer-readable medium of claim 76, wherein the first change comprises an erroneous modification to the at least one credit-related data element and the second change comprises a correction of the erroneous modification to the at least one credit-related data element.

78. The method of claim 77, wherein selection of a method of notification further comprises: selecting a timing of notification.

79. The method of claim 78, wherein the timing of notification may be selected from a group consisting of immediate notification, periodic notification, and upon request notification.

80. The method of claim 78 further comprising setting a subscription price, wherein the subscription price depends on the timing of notification.

81. The method of claim 76 further comprising;

setting a subscription price.

82. The method of claim 81, wherein the subscription price depends on the number of credit-related data elements selected for monitoring.

83. The method of claim 81, wherein the subscription price depends on the method of notification selected.

84. The method of claim 81, wherein the subscription price depends on a frequency of the selected notification.

85. The method of claim 76, wherein the method of payment is selected from a group consisting of monthly, annually, and per use basis.

86. The method of claim 76, wherein the method of payment is on a prepay basis.

* * * * *